May 23, 1939.   H. A. LEVEY   2,159,704
CIGARETTE AND METHOD OF MAKING THE SAME
Filed May 4, 1937
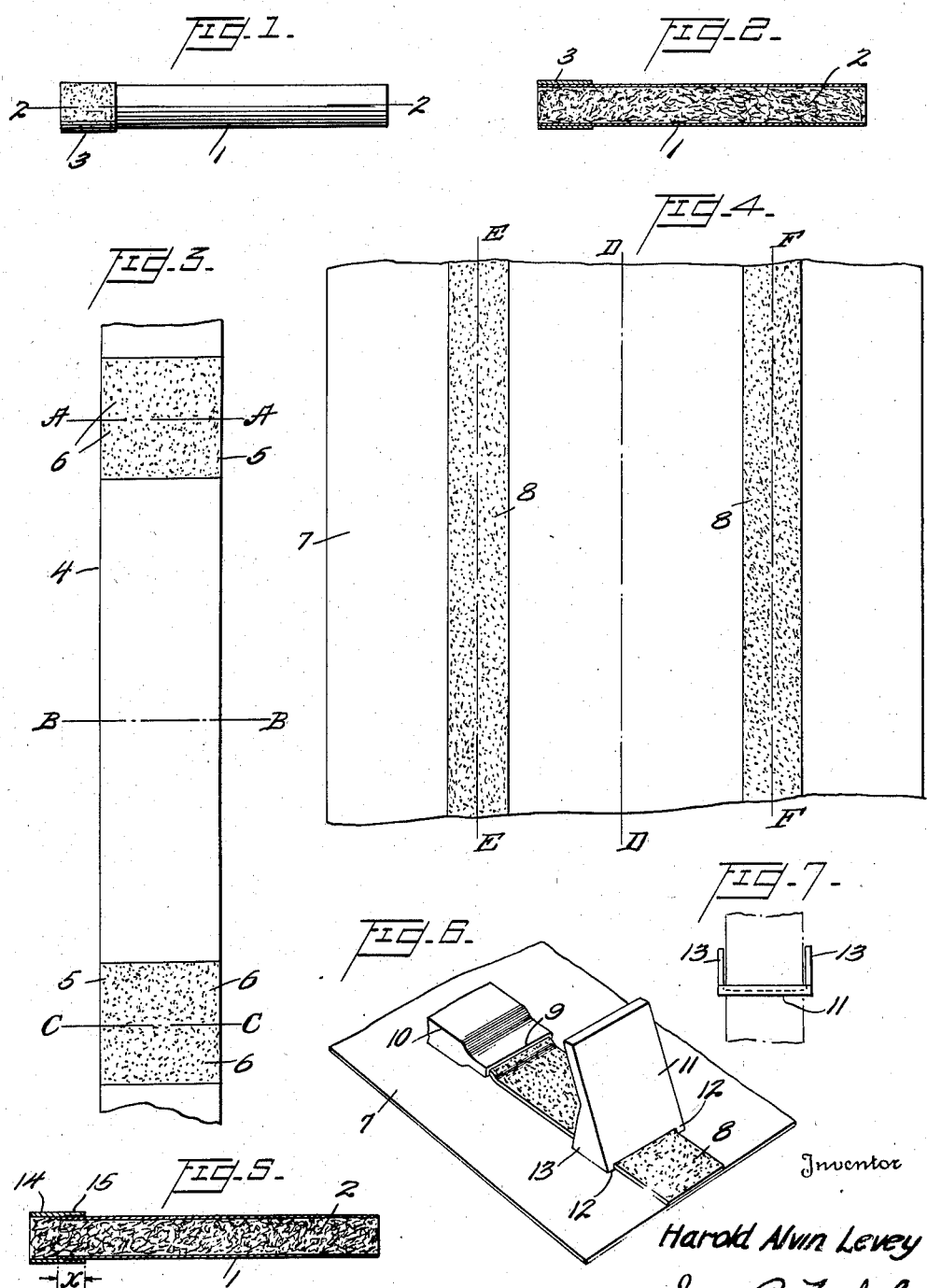
Inventor
Harold Alvin Levey
By Ivan P. Tashof
Attorney Patented May 23, 1939

2,159,704

UNITED STATES PATENT OFFICE 2,159,704

CIGARETTE AND METHOD OF MAKING THE SAME

Harold Alvin Levey, New Orleans, La.

Application May 4, 1937, Serial No. 140,716

11 Claims. (Cl. 131—39)

The present invention relates to the production of a composite body having a base member to which has been applied, to at least a portion thereof, a plastic material, namely, a relatively high percentage of solids, whereby the plastic material is adapted to be cast or extruded onto the base material. The plastic material, preferably, contains as its solid ingredient a cellulose ester, although other plastic materials may be used, as hereinafter pointed out.

The basic invention, and the more specific forms thereof, all as hereinafter pointed out, has many applications, but one application for which it is particularly suitable is the production of a cigarette having a wrapper provided with a moisture or waterproofed tip. It may be pointed out that it has hitherto been proposed to provide a cigarette tissue or wrapper with a composite tip, the outer lamination of which is waterproofed but the procedure employed in the preparation of the cigarette tip has always been unsatisfactory from the chemical and physical standpoints.

The present invention has for one of its objects the production of a cigarette having a waterproofed composite tip, the outer lamination of which is formed by applying a viscous plastic material. Any suitable means may be used for applying the outer lamination, but, preferably, it is applied by extruding or casting a properly formulated viscous plastic material onto the cigarette tissue, said plastic material containing sufficient bonding ingredients, most desirably, volatile solvents, to assist the plastic material to adequately bond itself to the surface of the paper.

Another object of the present invention is to treat the tip end of the cigarette tissue which is to be waterproofed, with an agent inhibiting the impregnation of the pores of said tissue by the wet plastic. This agent may be a solid agent or it may be a liquid, preferably a volatile liquid, which is immiscible and incompatible with the waterproofing solution. The solution is present in the plastic material, preferably, in a quantity only sufficient to assist the plastic material to bond itself to the paper.

The solvent, preferably, comprises a mixture of a high boiling point component and a low boiling point component, the former, in one aspect of the present invention, being present in a quantity adapted to substantially inhibit any "skin drying" of the plastic material.

If desired, the low boiling point component may be a non-solvent for the plastic base. The plastic material has a plasticizer present, preferably in an amount adapted to reduce the curling of the composite tip to a minimum. The smaller the amount of plasticizer present the greater the amount of shrinkage and resulting curling.

The invention is illustrated in the accompanying drawing, in which:

Figure 1 is a plan view of a cigarette provided with a tip produced in accordance with the present invention;

Figure 2 is a longitudinal cross sectional view taken on line 2—2 of Fig. 1;

Figure 3 shows a tissue paper blank, the width of which is equivalent to the circumference of a standard cigarette in addition to the necessary lap required to roll the tissue into cigarette form, both ends of the tissue being provided with moisture proof tip material;

Figure 4 shows a different form of blank adapted to produce cigarette tissue in accordance with the present invention;

Figure 5 illustrates a modified form of the invention;

Figure 6 illustrates diagrammatically apparatus suitable for extruding the viscous plastic material onto the cigarette tissue;

Figure 7 is a plan view of the apparatus shown in Figure 6.

Various plastic materials may be used in carrying out the present invention. While cellulose acetate is the most desirable plastic mass for carrying out the invention, various other cellulose compounds may be used, such as the cellulose ethers which may be of the aliphatic substituted type or the aromatic substituted type, the former being exemplified by cellulose methyl ether and cellulose ethyl ether, and the latter by cellulose benzyl ether. Any plastic mass which is capable of forming a very viscous solution and which meets the requirements herein described may be used, including cellulose nitrate, chlorinated rubber plastics, such as pliofilm, gelatin, casein, or starch, some of these materials being provided with a waterproofing coating. For example, gelatin, casein and starch may be provided with a suitable waterproofing composition, such as cellulose lacquers or resin lacquers, or those lacquers having both cellulose derivatives and resins present, each of which is compatible wth the other.

The following is an example of the preparation of a plastic solution suitable for extruding or for in situ casting, as hereinafter set forth:

| | Percent by weight |
|---|---|
| Cellulose acetate | 8 to 16 |
| Plasticizer | 2 to 4 |
| Pigment | 1½ to 4 |
| Acetone | 70 to 80 |
| Diacetone alcohol | 14 to 18 |

As an example of a plasticizer suitable for use in the above mixture, mention is made of para-toluene-sulfon-amide. Instead of using a single plasticizer, a mixture of plasticizers may be used, as for example a mixture of para-toluene-sulfonamide and tri-phenyl phosphate. The above plasticizers are merely illustrative of a number of plasticizers well known in the art for the plasticizing of plastic materials including cellulose derivatives, such as cellulose acetate and the like, and any of such prior art plasticizers may be used.

When it is desirable that the film shall be translucent or opaque, it is desirable to add an opaquing agent thereto, a number of which are well known in the art. One of the best opaquing agents is barium sulphate. However, instead of using this opaquing agent, pigments, such as talc, asbestine, titanium dioxide, zinc oxide and the like may be used.

It is to be noted that the solvent constituent of the viscous mass consists of a mixture of two kinds of solvents, one being a high boiling point solvent and the other being a low boiling point solvent. It is desired to point out that there should be present in the mixture a sufficient amount of high boiling point solvent, such as diacetone alcohol, to prevent a "skin drying" effect upon the plastic which would otherwise prevent the satisfactory adherence of these viscous solutions or plastics to the cigarette tissue.

It is desired to point out that one of the features of the present invention is the provision of a viscous plastic wherein the proportion of the high boiling point solvent present inhibits any "skin drying" effect. This is preferably present in a plastic mass which permits extrusion or casting, in accordance with the present invention.

The plastic mass requires sufficient solvents to give the desired viscosity considering the solid content of the plastic. After there has been determined the amount of high boiling point solvent necessary in the mixture to comply with the above criterion, the remainder of the necessary solvent is made up by using a low boiling point solvent such as acetone.

The low boiling point solvents may or may not be active solvents for the plastic material being used, such as cellulose acetate. In other words, the low boiling material may be a non-solvent of the plastic, such as cellulose acetate, and merely function as a diluent in a properly formulated viscous mass.

It may be stated that the dominating properties required of both the low and high boiling point solvents is that they be present in amounts adapted to produce good leveling of the mixture, that is, spreading out of the mixture after extrusion or casting, and at the same time prevent "blush" of the film as it dries.

It is to be noted that the high boiling point solvent is present in a relatively minor proportion, and that the low boiling point solvent is present in a major or predominating proportion. Instead of using diacetone alcohol other suitable illustrative solvents are ethyl lactate and mono methyl ether of ethylene glycol.

Another representative plastic solution may be prepared in accordance with the following:

| | Per cent by weight | |
|---|---|---|
| Cellulose acetate | 75 to 90 | |
| Plasticizer | 10 to 25 | 23%–30% solids |
| Barium sulphate | 15 to 20 | |
| Diacetone alcohol | 10 to 20 | |
| Acetone | 9 parts | |
| Benzol | 4 parts | 75 to 90 volatile solvents 70-77% |
| Methanol | 5 parts | |

It is highly important, in accordance with the present invention that the plastic contain a relatively high percentage of solids. In general, the amount of solids present should be between 25% and 75% of the weight of the solution; in the above example, the solids vary between 23% to 30% and the volatile solvents vary between 70% to 77%. It is, of course, not desired to be limited to these particular percentages, the dominant thought being to provide a relatively viscous plastic material which is in contradistinction to the prior art materials which were relatively dilute solutions in which the cigarette paper was dipped or alternatively, the solution was sprayed or brushed onto the cigarette paper. In accordance with the present invention, the plastic material must be of such viscosity as to be capable of extrusion through a nozzle, or in another form of the invention, have sufficient solids present to enable the solution to be cast. In both cases, it is necessary to have a high percentage of solids present in the mixture. In some cases, the organic solvents used may be solvents for the plastic, or, alternatively, the carrying medium for the plastic material may be partially a solvent for the material and partially a non-solvent for the material, the proportion of the solvent and non-solvent used, of course, depending upon the type of plastic used, as for example, cellulose nitrate.

Referring to the viscosity of the solution, it is exceedingly difficult to state with preciseness the range of the viscosity. However, as an illustrative example, it may be stated that the viscosity of the solution may vary between five (5) seconds and five hundred (500) seconds in accordance with the standards of the A. S. T. M. It may be stated that the viscosity may be measured in exact terms by the falling ball method at 25° C. through a drop of ten (10) inches, which is the procedure described in detail in "Pyroxylin Enamels and Lacquers" by S. P. Wilson, second edition (1929), pages 16 to 18. In testing the viscosity, it may be stated that the value of the cellulose acetate used in seconds viscosity should be the result of the viscosity attained from a solution in pure acetone, consisting of 16 ounces of dry cellulose acetate per gallon.

The amount of shrinkage of the composite film may be regulated by regulating the amount of plasticizer in the composition. The smaller the amount of plasticizer, the greater the amount of shrinkage and the resulting curling of the composite film of plastic and tissue, as for example, cellulose acetate and tissue. The larger the amount of plasticizer, the less the amount of shrinkage and curling of the dried composite film. As an illustrative example, it may be stated that the plasticizer may vary between 10% to 65% of the weight of the dried film or laminated composite of cellulose acetate and other non-soluble solids, such as the pigments in the illustrative examples presented above. Curling may be corrected after the film is dried by passing the same between heated rolls or between hot smooth plates which readily corrects any distortion resulting from characteristic colloidal shrinkage. In the above illustrative examples, cellulose methyl ether, cellulose ethyl ether, or cellulose benzyl ether may be substituted for the cellulose acetate content without any other change.

Other cellulose esters may be used, such as cellulose propionate, cellulose butyrate and cellulose benzoate.

Another example in which all the ingredients are designated by percentages of weight is:

| | Per cent |
|---|---|
| Cellulose acetate | 18 |
| Ethyl para toluene sulphonamid | 3 |
| Triphenyl phosphate | 3 |
| Barium sulphate | 5 |
| Acetone | 53 |
| Diacetone alcohol | 18 |

In addition to the cellulose derivatives, other waterproofing agents may be used in compositions of the general character illustrated by the above examples, and more particularly the various resins both natural and synthetic, may be used when properly plasticized, the synthetic resins being preferable for use in accordance with the present invention. There may be substituted in the above examples for the cellulose ester content, glyceryl phthalates, vinyl esters, forms of the phenol aldehydes, formaldehyde ureas, the cumar resins and similar varieties. In some cases, however, as for example, when cumar resins are used, it is preferable to replace the solvents in the above examples with aromatic hydrocarbons, such as benzol and zylol.

Further, the waterproofing material may be made of natural or synthetic rubber solutions. The natural rubbers are dissolved usually in acetone, carbon bi-sulphide, and the like, while the synthetic rubbers, such as "duprene" "thiokol" and the chlorinated rubbers and rubber hydrochlorides are usually carried in the chlorinated hydrocarbons, such as ethylene dichloride and the like.

When waterproofing solutions of the natural rubbers or the chlorinated rubbers are used, these solutions may be compounded with ingredients of the character set forth in the above illustrative examples, including the plasticizer, a pigment, and a solvent, the latter, preferably, including a mixture of a high boiling point solvent and a low boiling point solvent, all as previously referred to.

It may be pointed out that the present invention in its broadest form, is directed to the formation of a plastic film in situ upon the surface of a base material which is porous, as for example, tissue paper, said base material being treated to prevent penetration of the plastic into the pores of the base material, as for example, the cigarette tissue. In general, it may be stated that the composite product, in the broadest form of the invention, is built up of two distinct laminations bonded together at their surfaces only by the extent of the paper fibers projecting above the paper surface. This is in sharp contradistinction to the prior art products, in which the impregnating and coating solutions have been made very thin-bodied, for the express purpose of impregnating the base material.

The present invention, in its broadest form, is directed to the avoidance of penetration of the coating solution into the pores of the base material. This may be accomplished as follows:

The base material, such as cigarette tissue, may be impregnated or saturated with a liquid which is immiscible and incompatible with the plastic solution. For this purpose, there may be used a volatile petroleum hydrocarbon, of which kerosene and related homologues are illustrative examples. Substituted hydrocarbons, such as chlorinated hydrocarbons or untreated hydrocarbons may be used, provided said compounds have a rate of volatility more or less equivalent to kerosene, the naphthas, mineral spirits, and the like, which will permit their ready removal by evaporation under optimum conditions as to speed of operation and readiness of recovery.

Instead of treating the surface with a volatile agent inhibiting penetration of the plastic material into the pores of the base material, the surface of the base material may be filled with a filling agent to inhibit excessive wetting and penetration of the surface pores by the wet plastic. Any suitable pigment may be used as the filling agent. Other examples of filling agents are finely divided talc, some forms of the hydrated silicates, especially the magnesium aluminum silicate hydrates, mica and the metallic salts of the higher fatty acids, of which the metallic stearates are representative. Satisfactory results may be obtained by using zinc and aluminum stearates.

Referring to the drawing, I represents the final cigarette tissue, in which the tobacco 2 is wrapped. It is to be noted that the tissue paper I is provided with a waterproof lamination 3 of a cellulose derivative, said lamination standing above the tissue paper and forming the final waterproofing coating of the tip.

The numeral 4 designates a strip of tissue paper, the width of which is equivalent to the circumference of a standard cigarette plus the necessary lap required in standard construction. At intervals along the length of the strip, there is extruded a coating 5, the length of the coating 5 being sufficient to form the tip portions 6 of two finished cigarettes. The distance between the separated coatings 5 is sufficient to form two cigarette wrappers. In order to form these wrappers from the coated strip, the latter is cut along the lines A—A, B—B and C—C to thereby provide a plurality of cigarette wrappers.

As shown in Figure 4, the paper 7 has extruded thereon lengthwise of the paper, coatings 8, the width of each coating being sufficient to form the tip portions of two cigarettes. The distance between adjacent coatings 8 is such as to provide for the length of two cigarettes. In making the final wrappers, the treated tissue is first cut along the line D—D to provide a blank having the coating 8 of sufficient width to provide the length portion of cigarettes. Thereafter, the severed blank is cut along the lines E—E to provide duplicate composite strips, each of which furnishes a blank for the production of a number of composite cigarette wrappers. Similarly, the second strip produced by severing along the line D—D may be severed along the line F—F to produce two strips having composite end portions adapted to form the tips of a plurality of cigarettes. The strips, instead of being adapted to form a plurality of cigarettes, may be adapted to merely form a single cigarette, depending upon the type of automatic cigarette machine used in the manufacture of the cigarettes. It is to be noted that cutting along the lines A—A, C—C, E—E and F—F provides wrapper blanks, the one edge of which has the waterproofed tip, while cutting along the lines B—B and D—D provides for the other end of the cigarette, that is, the end which is lighted and burns in the smoking operation.

In carrying out the invention, the viscous plastic material may be extruded from the mouth 9 of the extrusion device 10 directly onto the paper 4 or 7, this paper functioning as a carrying surface for the plastic material which is extruded. Preferably, the extrusion nozzle may be spaced between one-eighth (⅛) and one-half (½) inch above the paper to which the plastic lamination is applied. However, when the percentage of high boiling solvents is reduced to between 3% and 10% of the weight of the solvent mixture, then the film may be formed directly upon the tissue paper without any intervening air space.

The distances referred to are merely illustrative and not by way of limitation. It may be stated that by varying the distance between the point where the plastic is extruded from the extrusion nozzle and the point of contact of the extruded mass with the tissue paper, the degree of adhesion of the plastic to the paper mass to some extent is controlled.

In the form of the invention shown in Figures 6 and 7, there is provided a doctor blade 11 which gauges down the plastic film to the desired thickness, while the film is still wet. In all forms of the extrusion device, such as a nozzle, it is, of course, desirable that the width of the nozzle or slot from which the plastic is extruded, should be of a width so that dried film formed upon the tissue paper will be equivalent in width to two cigarette tips when cut exactly in half. As stated, this is merely a preferred procedure.

The doctor blade is provided with feet 12, the function of the feet 12 being not only to precisely gauge the thickness of the film, but also to define the edges of the film. The feet are provided with heels 13, which function to take care of the periodic accumulation of plastic which deposits behind the doctor blade, but which must be carried to fill in low areas along the deposited film.

It may be pointed out that the present invention provides a method of extruding a very viscous properly formulated plastic, preferably, the cellulose derivatives, and more specifically cellulose acetate, which is non-inflammable, onto the tissue paper, from which the cigarettes are made, said plastic containing sufficient volatile solvents to bond itself onto the paper without penetrating the same, the surface of the paper having been preferably treated with an agent inhibiting the penetration of the plastic into the pores of the paper. This procedure not only eliminates the older, slower and more costly process of gluing or bonding plastics, such as transparent cellulose sheeting, onto the tissue, but effects a saving of time and equipment, as well as of adhesive, while simultaneously producing a uniform bond over the entire surface of contact, giving an integral composite or laminated tip of marked uniformity.

It may be further pointed out that proceeding in accordance with the present invention, it is possible to manufacture and satisfactorily use a waterproofing film very considerably thinner than that which would be required to bond a separately performed film to the tissue surface. The plastic material may, if desired, be so compounded as to form a transparent lamination. In other words, the pigments may be left out of the compositions herein recited.

However, these transparent surfaces are usually smooth and glossy, giving place to slippage while in the mouth of the user, and in order to prevent said slippage, and to produce a slightly roughened surface, the pigment is added. Any material may be added which will produce a matted surface to avoid slippage. The roughness of the surface is very slight, but it is sufficient, in the preferred form of the invention, to prevent slippage.

After the plastic is extruded onto the paper, the composite blank is treated to remove the volatile solvents from the plastic material. This is preferably carried out at diminished pressure and/or elevated temperatures, the solvent vapors being conducted into forms of standard equipment, now available for solvent recovery, said solvents being reused in the preparation of additional quantities of plastic material.

The plasticizers herein referred to, besides performing the functions recited, reduce the combustibility of the final coating composition.

It is to be noted that the degree of adhesion and the amount of penetration of the plastic below the surface of the tissue may be controlled by the invention herein set forth, including the regulation of the viscosity of the plastic material on one hand, and the amount of high and low boiling point solvents used in the preparation of the plastic.

It may be stated that when the cigarette tip is a completely composite entity, that is, when the cigarette tissue acts as a carrier for the entire plastic lamination, that a plastic film of five ten thousandths ($5/10000$) of an inch is adequate to produce the desired degree of waterproofness required by the tip.

Instead of having the plastic film cover the entire tip end of the cigarette tissue, it is within the province of this invention to extrude the plastic material onto a portion of the cigarette edge and have part of the extruded film project beyond the cigarette edge to form a cigarette tip such as shown in Figure 5, the extruded film having a portion 14 projecting beyond the end of the cigarette wrapper, a portion 15 of the cigarette film being bonded to the cigarette wrapper. In other words, a portion of the film forms a composite lamination with the cigarette wrapper, and the remaining portion of the film extends beyond one end of the cigarette wrapper to form a non-composite tip portion.

In making the above modified form of the invention, it is desirable that the film should be about one one thousandth ($1/1000$) of an inch thick or twice as thick as the composite tip shown in Figures 1 and 2.

By decreasing the distance X of the plastic film on the cigarette tissue, a cigarette may be produced in which the waterproof tip is substantially composed wholly of a non-laminated moisture-proof film.

In accordance with the present invention, the film, instead of being extruded directly onto the cigarette wrapper, may be extruded onto a forming surface consisting of highly polished metals or organic or inorganic compositions upon which the solvents in the plastic composition do not react. This extruded film may be united with the surface adjacent one end of the cigarette wrapper in any suitable manner so that a portion of the film will lap the tissue by an amount equal to about three thirty-seconds ($3/32$) of an inch, the object not being to produce a composite tip, but a non-composite tip in which the one composite element is the plastic film, but which necessarily must slightly overlap the cigarette tissue at one end thereof. This film may be made of the same materials and in the manner hereinbefore specifically set forth, and the cigarette tissue may be prepared as herein before specifically set forth.

In carrying out the invention, a piece of cigarette paper is coated with a heavy bodied, very viscous solution of a plastic material, for example, cellulose acetate, which contains, for example, about 15% by weight of the solvents of a high boiling point solvent, such as di-acetone alcohol. The film was cast or extruded onto a cigarette paper which was precoated or impregnated with kerosene to a degree of saturation, which resulted in an excess of hydro-carbon being present upon the surface of the tissue.

A variation of the above example is as follows: The tissue was pre-treated with a limited amount of a non-volatile hydrocarbon, such as petroleum jelly. Any excess of the jelly which appeared upon the cigarette tip cover was thoroughly removed by complete wiping. The cellulose acetate solution was of a viscosity less than one-half (½) of the plastic referred to in the previous immediately preceding example, while the solvents contain 25% of the high boiling point ingredients. After the cellulose acetate film had been hardened by the evaporation of the solvent, the residue of petroleum jelly which prevented the penetration of the cellulose acetate was removed from the tissue by washing with a volatile petroleum solvent, such as pentane, which is a non-solvent for the particular plastic material used, namely, cellulose acetate.

In an alternative method of carrying out the invention, the surface of the cigarette tissue was rubbed with finely divided talc, this penerating into the pores of the tissue while the excess was dusted off. The cellulose acetate solution was then extruded or cast upon the face of the tissue.

While the present invention, in its specific aspect, is concerned with the production of a waterproofed tip having an extruded or cast plastic lamination, the invention is not limited to the production of this specific article. A similar tip may be provided on a cigar. Further, the invention is not limited to articles of the type of cigarettes or cigars. It may have many other applications. The basic idea of extruding a plastic material onto a thin base material has many uses, and it is, therefore, desired to state that the broadest aspect of the invention resides in the method of preparing a composite laminated film by extruding a mass containing a plastic material onto the base material, and the article produced therefrom. In practicing the method and producing the article, all the specific variations of the basic inventon, as herern set forth, may be employed. The plastic material may be extruded onto a rubber base, a cloth base, a light weight flexible and pliable metallic base. The method may be employed for the production of surgical dressing tissues, preparation of lamp shade covers, moth bags and the like.

While the base material has been set forth as cigarette tissue or paper, other materials may be used which have pores, and in some cases, it may be unnecessary to treat the base material with an agent inhibiting impregnation of the pores of the tissue by the wet plastic, since, for certain purposes, it is advantageous to have a slight impregnation of the pores. It is not necessary that the base material be provided with pores. Certain base materials may be substantially non-porous and the extruded mass attached thereto by mechanical means, or by a roughening of the outer surface, said roughening being produced either mechanically or chemically.

The term "leveling out" as used in the present specification, refers to the adjustment of the coating composition to a smooth plane surface free from ripples or other irregularities.

The term "blush" as used in the present specification, applies to the development of an opalescent or translucent film, or film with a matt surface. The development of such a surface is usually due to moisture in the surrounding air which condenses on the film as a result of the lowering of the film temperature caused by the rapid evaporation of the solvents, the latent heat and evaporation of which is responsible for the lowering of the temperature and the resulting condensation which occurs. This frost or opalescence is due to the incompatibility of water with the solvents, as well as the insolubility of the plastic material, as for example, cellulose acetate, in the water of condensation.

I claim:

1. The method of waterproofing cigarette paper comprising treating at least the tip portion of the cigarette tissue with an agent substantially inhibiting the impregnation of the pores of the tissue by a subsequently applied plastic material, applying by extruding on at least a portion of the paper including the so-treated tip portion a heavy bodied viscous plastic material, said material containing sufficient volatile ingredients to enable the viscous plastic to bond itself to the paper without penetrating the same, and drying the so-treated cigarette tissue.

2. The method of waterproofing cigarette paper comprising extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper.

3. The method of waterproofing cigarette paper comprising extruding on said paper prior to the forming of the paper into a cigarette a relatively viscous plastic film having a solid content ranging from between 25% and 75% based upon the weight of the film solution and containing a volatile solvent, the quantity thereof being only sufficient to enable the extruded plastic film to bond itself to the paper while substantially minimizing the penetration of the solvent into the pores of the paper.

4. The method of waterproofing cigarette paper comprising extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper, said volatile solvent comprising a mixture of a high boiling point component and a low boiling component, the former being present in a quantity adapted to substantially inhibit any skin drying of the plastic material.

5. The method of waterproofing cigarette paper comprising extruding on said paper prior to the forming of the paper into a cigarette a relatively viscous plastic film having a solid content ranging from between 25% and 75% based upon the weight of the film solution and containing a volatile solvent, the quantity thereof being only sufficient to enable the extruded plastic film to bond itself to the paper while substantially minimizing the penetration of the solvent into the pores of the paper, said volatile solvent comprising a mixture of a high boiling point component and a low boiling point component, the former being present in a quantity adapted to substantially inhibit any skin drying of the plastic material.

6. The method of waterproofing cigarette paper comprising extruding on said paper prior to the forming of the paper into a cigarette a relatively viscous plastic film of a size at least sufficient to form a tip film on the finished cigarette, said viscous plastic film containing a plasticizer and a volatile solvent component, the quantity thereof being only sufficient to enable the extruded plastic film to bond itself to the paper while substantially minimizing the penetration of the solvent into the pores of the paper, said plasticizer being present in an amount adapted to reduce the curling of the composite tip portion to a minimum.

7. The method of waterproofing cigarette paper comprising extruding on said paper prior to the forming of the paper into a cigarette a relatively viscous plastic film of a size at least sufficient to form a tip film on the finished cigarette, said viscous plastic film containing a plasticizer and a volatile solvent, the quantity of the latter being only sufficient to enable the extruded plastic film to bond itself to the paper while substantially minimizing the penetration of the solvent into the pores of the paper, the volatile solvent comprising a mixture of a high boiling point component and a low boiling point component, the former being present in a quantity adapted to substantially inhibit any skin drying of the plastic material, said plasticizer being present in an amount adapted to reduce the curling of the composite tip to a minimum.

8. The method of waterproofing cigarette paper comprising extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper, said volatile solvent comprising a mixture of a high boiling point component and a low boiling point component, the former being present in a quantity adapted to substantially inhibit any skin drying of the plastic material, and the low boiling point component being a non-solvent for the plastic base.

9. The method of waterproofing cigarette paper comprising treating that portion of the cigarette paper to be waterproofed with a solid agent substantially filling the pores of the paper, extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper.

10. The method of waterproofing cigarette paper comprising treating that portion of the cigarette paper to be waterproofed with a volatile liquid which is immiscible and incompatible with the waterproofing solution, to minimize the wetting of the cigarette tissue and the impregnation of the pores thereof by the wet plastic, extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper.

11. The method of waterproofing cigarette paper comprising treating that portion of the cigarette paper to be waterproofed with an agent inhibiting the impregnation of the pores of the paper by a wet plastic material, extruding on said paper prior to the forming of the paper into a cigarette a relatively viscous plastic film of a size at least sufficient to form a tip film on the finished cigarette, said viscous plastic film containing a volatile solvent, the quantity thereof being only sufficient to enable the extruded plastic film to bond itself to the paper while substantially minimizing the penetration of the solvent into the pores of the paper.

HAROLD ALVIN LEVEY.